United States Statutory Invention Registration [19]

[11] Reg. Number: H338

Lipp

[43] Published: Oct. 6, 1987

[54] RESONANT FREE PLATEN FOR VIBRATION TESTING OF TEST SPECIMENS

[75] Inventor: Louie J. Lipp, Fallston, Md.

[73] Assignee: The United States of America as represented by the Secretary of the Army, Washington, D.C.

[21] Appl. No.: 944,123

[22] Filed: Dec. 23, 1986

[51] Int. Cl.[4] ..... G01M 7/00

[52] U.S. Cl. ..... 73/663

*Primary Examiner*—Stephen C. Buczinski
*Assistant Examiner*—Linda J. Wallace
*Attorney, Agent, or Firm*—Anthony T. Lane; Harold H. Card, Jr.; Michael C. Sachs

[57] ABSTRACT

This invention relates to a system for vibration testing of specimens using an electro-dynamic shaker. It overcomes the various undesirable consequences which attend the existing technology and methodology, which uses a constant thickness flat plate platen, by using an inverted, truncated pyramid type of platen, with both the base and top of square-rectangular-parallelpiped shapes, attached to a cylindrical shaker head. The outer portion of the platen has a very low mass and the section modulus is very high at the line of bending thereby increasing the resonant frequency of the platen while lowering the total weight of the platen, because there is less mass around the perimeter of the platen. The optimum shape of the pyramid is determined by a means which can be expedited by use of the computer program.

6 Claims, 12 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

RESONANT FREE PLATEN FOR VIBRATION TESTING OF TEST SPECIMENS

GOVERNMENT INTEREST

The invention described herein may be manufactured, used and licensed by or for the Government for Governmental purposes without the payment to me of any royalties thereon.

BACKGROUND AND SUMMARY OF THE INVENTION

In order to minimize costs and maximize vibration testing utility, test economics require that, when using an electro-dynamic shaker, that as large a number of test specimens as possible be placed on the shaker. This permits a rapid accumulation of test hours, thereby gaining high statistical confidence for a given test time. However, often frequencies are induced that excite the resonant frequency of some portion of the platen (the vibrating platform) onto which the test specimens are bolted.

Those test specimens attached to the resonating portion of the platen will experience much higher stress than either the test plan requires or that of items attached to a non-resonating portion of the platen. In addition, the location of the resonating portion of the platen changes as different frequency inputs excite different spring-mass systems at their individual natural frequencies.

When, at a certain frequency, one test specimen is subjected to greater vibrational stresses than another, the test may provide erroneous failure data for test and reliability analysis. This problem can defeat the entire purpose of the test and causes confusion as to the correct classification of a vibration caused failure. This problem has existed since a large number of items have been subjected to a wide band of vibrational frequencies for the purpose of life testing.

In the past, to solve the resonant frequency problem, four methods have been used. One solution was to use a constant thickness platen thick enough to prevent resonance in the platen corner for a given band of test frequencies. This solution proved unsatisfactory because the combined weight of the test specimens and the platen weigh more than the armature of the shaker can withstand. To maintain certain accelerations at low frequencies, a high displacement is required of the shaker. As the static load is increased on the armature, it lowers from a neutral position to a position closer to its lower limit of travel. Even if the static load is such that the lower limit safety switch is not activated, there is difficulty with activation at the lower end of the frequency spectrum required by the test program.

In the second method, if the platen cannot be made thick enough, then its mounting must be reduced in size, thereby decreasing the number of specimens to be tested by a single shaker. This would add to either the test time or the number of shakers required.

In another method, the solution is to avoid vibration at those frequencies that cause platen resonance. Since each corner of the platen will have at least one resonant frequency, a minimum of four very narrow bands of frequencies will have to be deleted from the test. However, complex electronic and mechanical systems have many small components that behave as individual spring-mass systems which, in turn, have individual resonant frequencies. Elimination of those frequencies which are in narrow bands of each platen resonance results in removal of some of the critical test frequencies for certain components thereby defeating the purpose of the test.

A final solution is to make the platen from a material with high viscous damping. The system is allowed to go through the various bands of resonance but would not reach high vibration amplitudes. Materials such as high viscous magnesium and certain irons are often used to keep amplitudes low at resonance, but some overstressing of test parts results. Instead of amplitude amplification on the order of six or more, it is usually dampened to two or three, but even at these amplitudes, parts are often overstressed, yielding erroneous test results.

The current design practice is to build a square flat plate platen of constant thickness, bolted onto the top of around shaker head, which causes a corner to resonate. The cantilevered corner behaves as a triangular plate which bends beginning from the point where the outer perimeter of the shaker head contacts the bottom of the platen. The difficulty with cantilevers is that the greater the structural masses extend from the line of bending, the lower the natural frequency. In addition, there exists a direct correlation between the area moment of inertia and the resonant frequency. A constant thickness flat plate platen has both unneeded mass at the outer corners of the vibrating triangle and a small area moment of inertia at the root of the cantilevered triangle where bending begins.

The present invention overcomes the various undesirable consequences which attend the existing equipment and methodology for vibration testing by using an inverted, truncated pyramid; the outer portion of the platen has a very low mass and the section modulus is very high at the line of bending thereby increasing the resonant frequency of the platen while lowering the total weight of the platen, because there is less mass around the perimeter of the platen.

It is an object of this invention to provide equipment and methodology for vibration testing which increases the resonant frequency of the platen.

It is another object of this invention to decrease the total weight of the platen, thereby allowing higher displacements at low frequencies of excitation.

Another object of this invention is to decrease the amount of unneeded mass thereby effecting a cost savings for construction material.

Still another object of this invention therefore, is to provide a system that provides uniform vibration stresses for all specimens subjected to the test.

Another object of this invention is to provide a system for reliability testing at the lower end of the frequency spectrum.

It is another an object of this invention to provide an economic and reliable means for vibration testing of testing multiple devices at the same time, thereby decreasing test time and the number of shakers otherwise required.

Still another object of this invention is to provide a method for testing at all critical test frequencies without elimination of any test frequencies.

It is another object of this invention to provide a system for vibration testing without overstressing of test parts.

Further objects and advantages of this invention will become more apparent in light of the following drawings and description of the preferred embodiment of the invention.

DESCRIPTION OF THE PREFERRED EMBODIMENTS OF THE INVENTION

Figure 1:
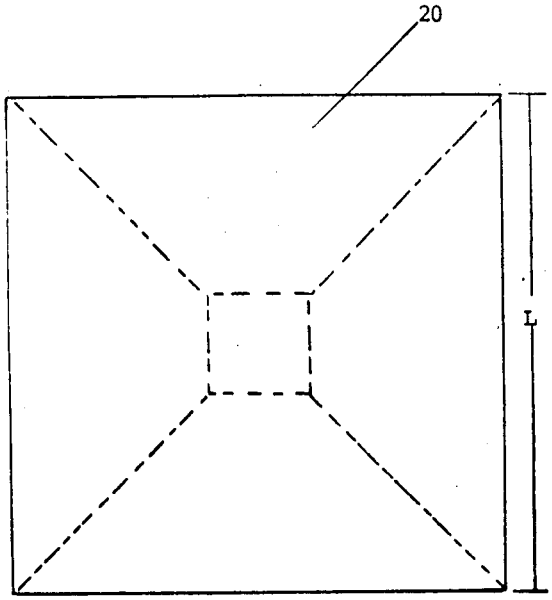
FIG. 1 is a top view of an embodiment of the vibration system.
Figure 2:
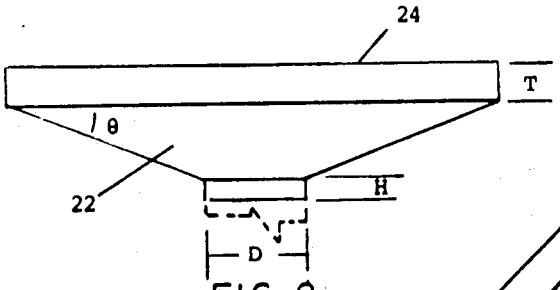
FIG. 2 is a side view of the embodiment shown in FIG. 1.
Figure 3:
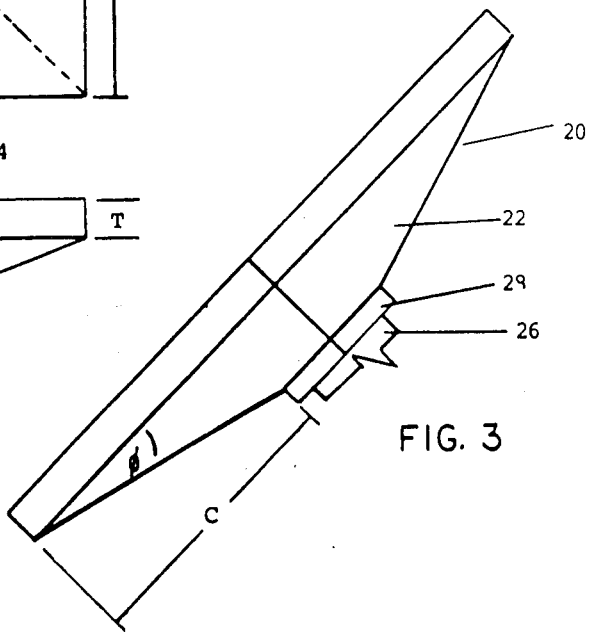
FIG. 3 is a 45 degree side view of the embodiment shown in FIG. 1.
Figure 4:
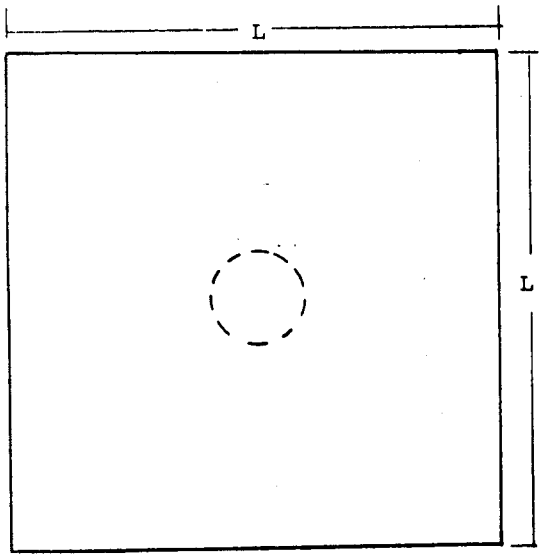
FIGS. 4 to 6 illustrate the top, side, and 45 degree side, respectively, of a prior art platen.
Figure 5:
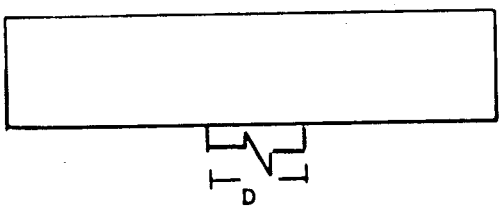
Figure 6:
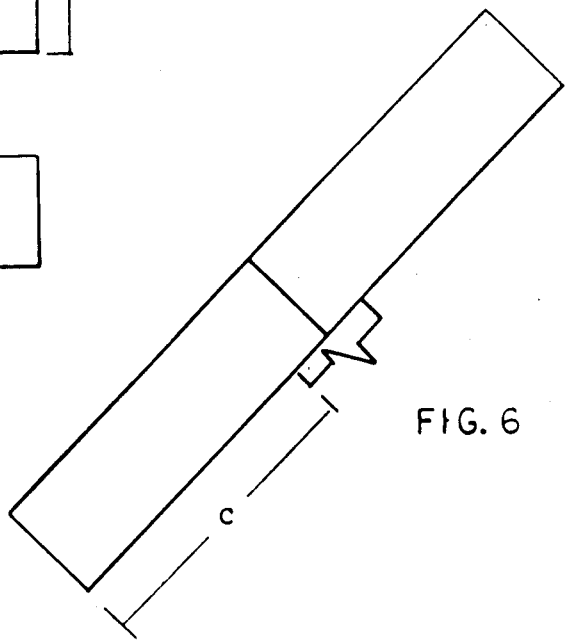

Referring to FIGS. 1, 2, and 3 of the drawings, there is a vibration testing system shown embodying the principles of this invention. The embodiment of the invention consists of a platen 20 for material testing in the shape of an inverted pyramid 22, shaped into a square-rectangular parallellepiped configuration to receive test material on the top surface 24 and the shaker head 26 on the bottom (base) 28. The top 24 is of sufficient thickness to provide the necessary thread depth for bolting down test specimens and the bottom 28 provides a surface for mounting the platen 20 onto the shaker head 26. In FIG. 2, there is illustrated the platen from a side view.

The design of the platen 20 is accomplished by solving Equation (1), as set forth below, through two iteration processes.

Equation (1) is:

$$f_N = 48.47\sqrt{\frac{E\tan^3\phi}{C}\left(\frac{C\rho\tan\phi + 12\frac{W}{A}}{54\,C^2\rho^2\tan^2\phi + 1380\,C\frac{W}{A}\rho\tan\phi + 8960\frac{W^2}{A^2}}\right)}$$

where:

$f_n$ = Natural frequency in Hertz;

E = Young's Modulus of Elasticity of platen material in pounds per square inch;

$\phi$ = Angle of the slope of the pyramid measured from the case along the edge formed by any two sides that come together up to the apex, in degrees, shown in FIG. 1;

W = Weight of the cornermost test specimen, fixture/adapters, and bolt heads, in pounds;

A = Platen area displaced by the cornermost test specimen and its fixturing, in square inches;

$\rho$ = Density of platen material, in pounds per cubic inch; and

C = Distance from platen corner to shaker head, in inches.

Equation (1) was derived by using the Raleigh Method of natural frequency calculation. It involves the solution of a fourth order differential equation and requires a rigorous application of mechanics of materials.

Figure 7:
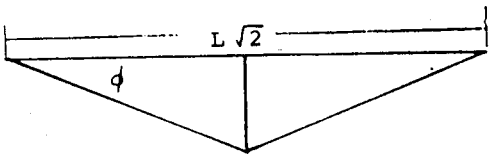
FIGS. 7 to 12 show schematics of the calculation steps for determining the optimum platen shape.
Figure 8:
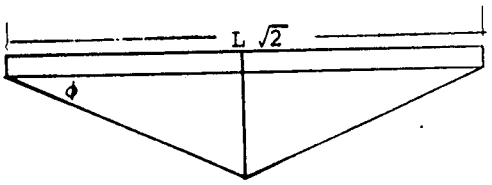

The use of Equation (1) for determination of the optimum shape of the platen requires an iteration process of changing the angle $\phi$ until a desired $f_n$ is found, which is the highest frequency used in a particular test program. This gives the basic shape of the platen 20. An example of the basic platen shape is shown in FIG. 7. After the basic shape is determined, a flat top surface 24 is added to the pyramid 22 as shown in FIG. 8 to provide a thread depth for bolting specimens down that are near the wedged edges of the platen 20.

Figure 9:
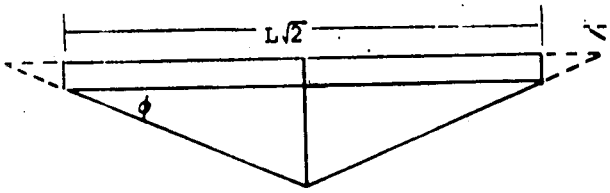

FIG. 9 has dashed lines showing the projection of the pyramid to a new larger size, which increases the length of the pyramid side using trigonometry. Equation (1) is iterated again to a larger angle $\phi$ because the resonant frequency drops when the size of the platen is increased. After completion of this second iteration, the platen shape will appear as in FIG. 10.

Figure 10:
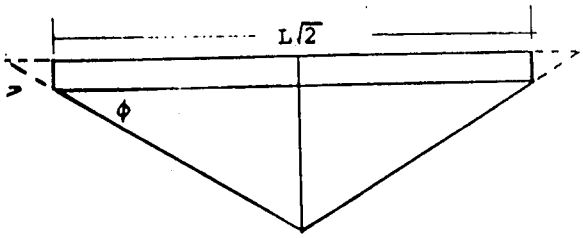
Figure 11:
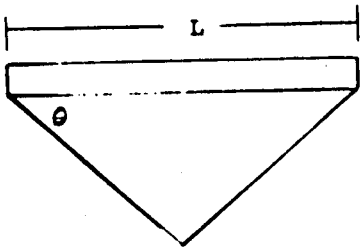

Since the dimensions shown in FIG. 10 are awkward for fabrication purposes, it is necessary to calculate the angle of the pyramid's sides with respect to its various sides, not its corner. Equation (2) provides this transformation.

Equation (2) is:

$$\theta = \text{ARCTAN}\,(\sqrt{2}\tan\phi)$$

Figure 12:
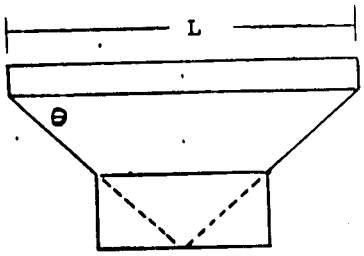

Finally, the pyramid 22 is truncated and a base 28 is added for mating with the shaker head 26. This is shown in FIG. 12.

The fabrication of the vibration testing system will now be described. Only two materials are normally used for platen fabrication, namely, aluminum and magnesium. The latter is preferred because of its lower density (about 30% lower than aluminum) and its favorable high viscous damping characteristics. However, aluminum is less costly than magnesium, therefore, if test emphasis is not placed on weight and damping, then aluminum is an economic alternative to magnesium.

Because of the large mass of metal and minimal machining required for drilling and threading of holes for bolting the platen 20 to the shaker head 26 and the test specimen to the platen top 24, casting is the least expensive method of platen fabrication.

For any test program, after determination of the specimen arrangement on the platen top 24, and measurment of the specimen and adapter weights, the computer program designs the platen 20 using the steps illustrated in FIGS. 7 to 12. This program, for computing the optimum design parameters for an inverted truncated pyramid type of platen for holding test specimens during vibration testing, is set forth as follows:

MISSING PAGE TEMPORARY NOTICE

PATENT # 4 338 FOR ISSUE DATE 10-6-87

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

COLUMN # 3, 4

```
1   IF  PEEK (104) <  > 64 THEN  POKE
      103,1: POKE 104,64: POKE 163
      84,0: PRINT  CHR$ (4)"RUN PL
      ATEN"
5   SPEED= 150
10  REM  THIS PROGRAM DETERMINES
      THE OPTIMUM DESIGN PARAMETER
      S FOR A TEST PLATEN
20  REM  FOR VIBRATION TESTING OF
       TEST SPECIMENS WITHOUT REAC
      HING A RESONANT
30  REM  CONDITION WITH A MINIMUM
       DEAD   WEIGHT LOAD ON THE S
      HAKERS ARMATURE.
50  HOME
60  VTAB (6)
70  PRINT "     THIS  PROGRAM DET
      ERMINES  THE"
80  PRINT "     OPTIMUM DESIGN PA
      RAMETERS FOR"
90  PRINT "     AN INVERTED TRUNC
      ATED PYRAMID"
100  PRINT "     TYPE  OF  PLATEN
       FOR HOLDING"
110  PRINT "     TEST SPECIMENS D
      URING VIBRAT-"
115  PRINT "     ION TESTING"
117  PRINT
120  PRINT  TAB( 14);"BY L.J.LIPP
      "
125  PRINT
130  PRINT  TAB( 14);"USAAMCCOM"
140  PRINT "     PRODUCT ASSURANC
      E DIRECTORATE"
150  PRINT "          FOR CHEMICA
      L SYSTEMS"
160  PRINT  TAB( 14);"1985"
170  FOR X = 10 TO 4000: NEXT X
200  HOME
210  VTAB (5)
220  PRINT "THIS PROGRAM REQUIRES
       THAT THE FIXTURE"
230  PRINT "DESIGNER COMPLETE A L
      AYOUT OF THE TOP"
240  PRINT "OF A SQUARE VIBRATION
       PLATEN BEFORE"
250  PRINT "GETTING ON THE COMPUT
      ER. THE DESIGNER"
260  PRINT "IS EXPECTED TO HAVE:"
270  PRINT
280  PRINT  TAB( 5);"1. ARRANGED
      ALL OF THE TEST SPECI-"
290  PRINT  TAB( 8);"MENS SO THAT
      THOSE WITH THE"
300  PRINT  TAB( 8);"LEAST WEIGHT
       (INCLUDING FIXTURE"
310  PRINT  TAB( 8);"ADAPTERS AND
      BOLTS) PER DISPLAC-"
320  PRINT  TAB( 8);"ED PLATEN AR
      EA ARE AT THE FOUR"
324  PRINT  TAB( 8);"CORNERS;"
330  PRINT
340  PRINT  TAB( 5);"2. THE TEST
      SPECIMENS ARE AS CLOSE"
350  PRINT  TAB( 8);"TOGETHER AS
      POSSIBLE, YET LEAVE"
360  PRINT  TAB( 8);"ROOM FOR WRE
      NCHES, POWER AND"
370  PRINT  TAB( 8);"SIGNAL CABLE
      S, ETC. TO KEEP THE"
380  PRINT  TAB( 8);"PLATEN'S SQU
      ARE DIMENSIONS AS"
390  PRINT  TAB( 8);"SHORT AS POS
      SIBLE;"
400  PRINT
410  PRINT  TAB( 5);"3. SELECTED
      THE PLATEN MATERIAL AND"
420  PRINT  TAB( 8);"KNOWS ITS YO
      UNGS MODULUS OF"
430  PRINT  TAB( 8);"ELASTICITY A
      ND DENSITY;"
440  PRINT
450  PRINT  TAB( 5);"4. DETERMINE
      D THE MINIMUM DEPTH"
460  PRINT  TAB( 8);"REQUIRED FOR
       THE BOLT THREADS"
470  PRINT  TAB( 8);"TO FASTEN TH
      E TEST SPECIMENS"
480  PRINT  TAB( 8);"AND FIXTURES
       DOWN TO THE PLATEN."
490  PRINT
500  PRINT "HAVE YOU COMPLETED TH
      ESE PRELIMINARY"
510  PRINT "DESIGN DETAILS? <Y OR
       N>"
515  GET A$
520  IF A$ <  > "Y" AND A$ <  > "
      y" AND A$ <  > "N" AND A$ <
       > "n" THEN 2000
530  IF A$ = "N" OR A$ = "n" THEN
      2100
540  HOME
550  PRINT "IMPORTANT NOTE: ALL R
      ESPONSES TO THE"
560  PRINT "FOLLOWING QUESTIONS A
      RE TO BE IN"
570  PRINT "DECIMAL FORM, NOT FRA
      CTIONS."
580  PRINT
590  PRINT "WHAT IS THE LENGTH OF
       A SIDE OF YOUR"
600  PRINT "SQUARE PLATEN IN INCH
      ES?": INPUT L
610  PRINT
620  PRINT "WHAT IS THE DIAMETER
      OF THE SHAKER HEAD"
630  PRINT "IN INCHES?": INPUT DI
      A
640  PRINT
650  PRINT "WHAT IS THE MINIMUM M
      ATERIAL THICKNESS"
660  PRINT "REQUIRED TO BE TAPPED
      TO BOLT THE TEST"
670  PRINT "SPECIMENS TO THE PLAT
      EN IN INCHES?"
680  INPUT TK
681  PRINT
```

```
682  PRINT "WHAT IS THE MAXIMUM F
     REQUENCY REQUIRED"
685  PRINT "IN THE TEST PROGRAM I
     N HERTZ?"
687  INPUT MF
690  PRINT
700  PRINT "WHAT MATERIAL HAVE YO
     U CHOSEN FOR THE"
710  PRINT "PLATEN?": INPUT M$
720  PRINT
730  PRINT "WHAT IS ";M$;"'S YOUN
     GS MODULUS"
740  PRINT "OF ELASTICITY IN POUN
     DS PER SQUARE INCH?"
750  INPUT E
760  PRINT
770  PRINT "WHAT IS ";M$;"'S DENS
     ITY IN"
780  PRINT "POUNDS PER CUBIC INCH
     ?": INPUT DEN
784  REM  THE FIRST SUBROUTINE SE
     LECTS THE PLATEN CORNER WITH
      THE HIGHEST SPECIMEN LOAD.
787  GOSUB 2500
800  REM  DETERMINE THE ANGLE PHI
      FOR THE ANGLE OF THE PYRAMI
     D'S EDGES.
805  SPEED= 255
810  GOSUB 3000
820  REM  THE THIRD SUBROUTINE AD
     DS THE MATERIAL THICKNESS TO
      THE PLATEN,
830  REM  AND CALCULATES A NEW TE
     MPORARY PLATEN LENGTH SO THE
     EDGES WILL BE WEDGE
840  REM  SHAPED AGAIN.
850  GOSUB 4000
860  REM  THE 4TH SUBROUTINE RECA
     LCULATES THE ANGLE AGAIN, BU
     T CALLING IT PHI2
870  REM  WHICH IS THE FINAL ANGL
     E OF THE PYRAMIDS EDGES.
880  GOSUB 5000
890  REM  THE 5TH SUBROUTINE CALC
     ULATES THE ANGLE THETA WHICH
      IS THE ANGLE
900  REM  FORMED BETWEEN THE INTE
     RSECTING PLANES OF THE PLATE
     N'S TOP AND SLOPING
910  REM  SIDES.
920  GOSUB 6000
930  REM  THE 6TH SUBROUTINE CALC
     ULATES THE THICKNESS OF THE
     PLATEN'S BASE. ITS
940  REM  SQUARE DIMENSIONS WILL
     BE IDENTICAL TO THE DIAMETER
      OF THE SHAKER HEAD.
950  GOSUB 7000
960  REM  THE 7TH SUBROUTINE CALC
     ULATES THE PLATEN WEIGHT.
970  GOSUB 8000
980  REM  THE 8TH SUBROUTINE DISP
     LAYS A PLATEN IN HIGH RESOLU
     TION GRAPHICS
990  REM  AND LABELS ALL DIMENSIO
     NS NECESSARY FOR FABRICATION
      EXCEPT THE TAPPED
1000 REM  HOLE LOCATIONS FOR TES
     T SPECIMEN MOUNTING.
1010 GOSUB 9000
1015 HOME
1020 PRINT "DO YOU WISH TO TRY A
     NOTHER DESIGN?"
1030 PRINT "IF SO, PRESS KEY <C>
     ; IF NOT, PRESS"
1035 PRINT "ANY KEY.": GET C$
1040 IF C$ = "C" OR C$ = "c" THEN
     550
1045 HOME
1047 VTAB (15)
1048 HTAB (17)
1049 PRINT "GOODBY": GOTO 2140
2000 PRINT "YOU HAVE ENTERED A R
     ESPONSE THAT THE"
2010 PRINT "COMPUTER DOES NOT RE
     COGNIZE.
2020 PRINT "LETS TRY AGAIN."
2030 PRINT
2040 PRINT "HAVE YOU COMPLETED T
     HESE PRELIMINARY"
2050 PRINT "DESIGN DETAILS? <Y O
     R N>": GET A$
2060 IF A$ = "Y" OR A$ = "y" THEN
     540
2070 IF A$ = "N" OR A$ = "n" THEN
     2100
2080 IF A$ <  > "Y" AND A$ <  >
     "y" AND A$ <  > "N" AND A$ <
      > "n" THEN 2100
2100 PRINT "PLEASE PERFORM THE P
     RELIMINARY LAYOUT"
2110 PRINT "STUDIES REQUIRED TO
     USE THIS PROGRAM."
2115 FOR X = 1 TO 2500: NEXT X
2121 HOME : VTAB (15): HTAB (17)
     : PRINT "GOODBY"
2140 END
2500 REM  THIS SUB-ROUTINE DETER
     MINES  WHICH CORNER HAS THE
      GREATEST SPECIMEN
2510 REM  LOAD BY DIVIDING THE W
     EIGHT IN EACH CORNER BY THE
     AREA IT DISPLACES.
2520 HOME : PRINT
2530 PRINT "ASSIGN EACH CORNER O
     F THE PLATEN A"
2540 PRINT "NUMBER SO THE WEIGHT
     S OF THE AREAS DIS-"
2550 PRINT "PLACED BY THE TEST S
     PECIMENS AND THEIR"
2560 PRINT "FIXTURING CAN BE IDE
     NTIFIED BY THEIR"
2570 PRINT "LOCATION ASSIGNMENT.
     "
2580 PRINT
2590 FOR X = 1 TO 4
2595 PRINT
2600 PRINT "WHAT IS THE WEIGHT O
     F THE TEST"
```

```
2610  PRINT "SPECIMEN, FIXTURING,
      BOLTS, WASHERS,
2620  PRINT "ETC. IN CORNER ";X;"
      ?": INPUT W(X)
2630  PRINT
2640  PRINT "WHAT IS THE AREA DIS
      PLACED ON THE"
2650  PRINT "PLATEN BY THE TEST S
      PECIMEN, FIXTUR-"
2660  PRINT "ING, ETC. IN CORNER
      ";X;"?": INPUT A(X)
2670 P(X) = W(X) / A(X)
2680  PRINT
2685  PRINT "THE CORNER'S LOAD IS
      ";P(X);" PSI"
2690  NEXT X
2700 S = P1:Y = 1
2705  IF P(1) < P(2) THEN P(1) =
      P(2):Y = 2
2710  IF P(1) < P(3) THEN P(1) =
      P(3):Y = 3
2720  IF P(1) < P(4) THEN P(1) =
      P(4):Y = 4
2730  PRINT "CORNER NUMBER ";Y;"
      HAS THE GREATEST"
2740  PRINT "LOAD OF ";P(1);" POU
      NDS PER SQUARE INCH."
2750  PRINT
2770  PRINT "PRESS <ANY KEY> TO C
      ONTINUE.": GET Z$
2780  IF Z$ =  >  CHR$ (0) THEN 2
      790

2790  HOME
2800  RETURN
3000  PRINT
3010  REM  THIS SUBROUTINE IS THE
      FIRST ITERATION TO DETERMIN
      E WHAT ANGLE PHI
3020  REM  SATIFIES THE EQUATION
      THAT DETERMINES THE MINIMUM
      NATURAL FREQUENCY.
3030 C = (L /  SQR (2)) - (DIA /
      2)
3040  FOR PHI = 5 TO 45 STEP .5
3050 RAD = PHI * 3.14159265 / 180

3060 T =  TAN (RAD)
3080 NU = (E * T * 3) * ((C * DEN
      * T) + (12 * P(1)))
3090 DM = C * ((54 * C * C * DEN *
      DEN * T * T) + (8960 * (P(1)
      * 2)))

3100  IF DM <  = 0 THEN 3130
3105 CF = 48.47 * ((NU / DM) * .5
      )
3110  IF CF >  = MF THEN 3700
3120  NEXT PHI
3125  SPEED= 150
3130  PRINT "THERE IS EITHER AN E
      RROR IN YOUR INPUT"
3140  PRINT "DATA OR THE MAXIMUM
      NATURAL FREQUENCY"
3150  PRINT "OF YOUR PROGRAM IS T
      OO HIGH FOR"
3260  PRINT "PRACTICALITY. THE HI
      GHEST FREQUENCY"
3270  PRINT "POSSIBLE FOR THE DES
      IGN INFORMATION"
3280  PRINT "PROVIDED IS ";CF;" C
      YCLES PER SECOND."
3290  PRINT
3300  PRINT "IT IS SUGGESTED THAT
      YOU PERFORM THESE"
3310  PRINT "CHECKS:"
3320  PRINT
3330  PRINT  TAB( 5);"1. RECHECK
      YOUR DATA INPUTS TO"
3340  PRINT  TAB( 8);"SEE IF THEY
      ARE CORRECT."
3350  PRINT
3360  PRINT  TAB( 5);"2. IF THE D
      ATA IS CORRECT IN #1"
3370  PRINT  TAB( 8);"ABOVE, THEN
      RECHECK THE LAYOUT"
3380  PRINT  TAB( 8);"TO DETERMIN
      E IF THE SPECIMENS"
3390  PRINT  TAB( 8);"CAN BE SET
      CLOSER TOGETHER. THE"
3400  PRINT  TAB( 8);"NATURAL FRE
      QUENCY INCREASES VERY"
3410  PRINT  TAB( 8);"RAPIDLY AS
      THE LENGTH OF THE"
3420  PRINT  TAB( 8);"PLATEN'S SI
      DES DECREASES."
3430  PRINT
3440  PRINT  TAB( 5);"3. IF NONE
      OF THE ABOVE CAN BE"
3450  PRINT  TAB( 8);"CORRECTED,
      YOU WILL HAVE TO"
3460  PRINT  TAB( 8);"ACCEPT A RE
      SONANT CONDITION IN"
3465  PRINT  TAB( 8);"THE PLATEN.
      "
3468  SPEED= 255
3470  PRINT
3480  PRINT "WHEN YOU PRESS <ANY
      KEY>"
3485  PRINT "THE PROGRAM WILL TER
      MINATE."
3490  GET Z$
3600  IF Z$ =  >  CHR$ (0) THEN 1
      045
3700  HOME
3710  RETURN
4000  REM  THIS SUBROUTINE ADDS T
      HE NECESSARY ADDITIONAL THIC
      KNESS FOR TAPPING
4010  REM  THREADS INTO THE PLATE
      N FOR THE BOLTING ON OF TEST
      SPECIMENS. IT THEN
4020  REM  CALCULATES A NEW PLATE
      N LENGTH TO FORM WEDGE EDGES

4030 NT = C * T + TK
```

```
4040  REM  THE ABOVE CALCULATION
      DETERMINES THE NEW TOTAL THI
      CKNESS OF THE PLATEN
4050  REM  AT DISTANCE 'C' ALONG
      THE PLATENS DIAGONAL.
4060  REM  THE NEXT CALCULATION D
      ETERMINES A NEW "C" BASED UP
      ON THIS THICKNESS
4070  REM  CALLED "NC".
4080 NC = NT / T
4100  RETURN
5000  REM  THIS 4TH SUBROUTINE RE
      CALCULATES THE ANGLE PHI BAS
      ED UPON "NC" AND "NT"
5010  REM  EXCEPT IT IS CALLED PH
      I2 TO KEEP IT SEPARATE FROM
      PHI. THE EQUATION IS
5020  REM  THEN REARRANGED AGAIN
      TO UTILIZE LINES 3050-3710 O
      F THE 2ND SUBROUTINE.
5040  FOR PHI2 = PHI TO 55 STEP
      1
5050 RAD2 = PHI2 * 3.14159265 / 1
      80
5060 T2 =  TAN (RAD2)
5080 NU2 = (E * T2 * 3) * ((NC *
      DEN * T2) + (12 * P(1)))
5090 DM2 = NC * ((54 * C * C * DE
      N * DEN * T2 * T2) + (8960 *
      (P(1) * 2)))
5100  IF DM2 <  = 0 THEN 3130
5110 CF2 = 48.47 * ((NU2 / DM2) *
      .5)
5125  IF CF2 >  = MF THEN 5200
5130  NEXT PHI2
5200  HOME
5210  RETURN
6000  REM  THIS SUBROUTINE CALCUL
      ATES THE ANGLE "THETA" WHICH
      IS THE ANGLE
6010  REM  FORMED BETWEEN THE INT
      ERSECTING PLANES OF THE PLAT
      EN'S TOP AND ITS
6020  REM  SLOPING SIDES.
6030 BETA = 45 * 3.1415926 / 180
6035 NG = (NC + (DIA / 2)) *  SIN
      (BETA)
6040 NT2 = (NC + (DIA / 2)) * T2
6045  IF NG = 0 THEN  HOME : PRINT
      "A DIVISION BY ZERO ERROR, R
      ECHECK YOUR WORK."
6050 TETA = ATN (NT2 / NG)
6060  HOME
6070  RETURN
7000  REM  THS SUBROUTINE CALCULA
      TES THE THICKNESS OF THE PLA
      TEN'S BASE. IT DOES
7010  REM  SO BY MULTIPLYING THE
      ANGLE THETA BY HALF THE DIAM
      ETER OF THE SHAKER
7020  REM  HEAD. IT ALSO CALCULAT
      ES THE TOTAL THICKNESS OF TH
      E PYRAMID FROM ITS
```

```
7030  REM  BASE (ITS TOP SINCE IT
      IS INVERTED) DOWN TO WHERE I
      TIS TRUNCATED.
7040 BASEHEIT =  TAN (TETA) * (DI
      A) / 2
7050 PYRAHEIT =  TAN (TETA) * L /
      2 - BASEHEIT
7060  HOME
7070  RETURN
8000  REM  THIS SUBROUTINE CALCUL
      ATES THE PLATEN'S TOTAL WEIG
      HT.
8010  REM  IT STARTS WITH THE TOT
      AL VOLUME OF THE TOP SQUARE-
      RETANGULAR PARALLEL-
8020  REM  PIPED.
8030 TPVOL = TK * L * 2
8040  REM  NEXT IS THE CALCULATIO
      N OF THE TOTAL VOLUME OF THE
       PYRAMID PORTION OF
8050  REM  THE PLATEN
8060 P1 = (( TAN (TETA) * L / 2) *
      L * 2) / 3
8063 P2 = (BASEHEIT * D * 2) / 3
8065 PVOL = P1 - P2
8070  REM  NEXT IS THE CALCULATIO
      N OF THE BASE VOLUME.
8080 BVOL = BASEHEIT * D * 2
8090  REM  NEXT IS THE TOTAL VOLU
      ME
8100 TTVOL = TPVOL + PVOL + BVOL
8110  REM  FINALLY, THE TOTAL PLA
      TEN WEIGHT.
8120 PLTWT = TTVOL * DEN
8130 PYRAHEIT = ( INT (PYRAHEIT *
      100)) / 100
8140 BASEHEIT = ( INT (BASEHEIT *
      100)) / 100
8150 TETA = ( INT ((TETA) * 180 /
      3.14159)) * 100) / 100
8160 PLTWT =  INT (PLTWT)
8200  RETURN
9000  REM  THIS SUBROUTINE PRINTS
       A DISPLAY OF THE SIDE AND B
      OTTOM VIEWS OF THE
9010  REM  PLATEN AND PRINTS OUT
      THE FINAL INFORMATION REQUIR
      ED TO DESIGN THE
9020  REM  PLATEN.
9040  HGR
9045  HCOLOR= 3
9050  PRINT  CHR$ (4)"BLOAD GRAPH
      "
10000  VTAB (22)
10010  PRINT "LENGTHS:"; TAB( 11)
      ;"L=";L;" IN."; TAB( 22 ;"D=
      ";DIA;" IN."
10015  PRINT "TO CONTINUE PRINTIN
      G DESIGN INFORMATION"
10016  PRINT "PRESS <ANY KEY >": GET
      C$
10017  IF C$ =  >  CHR$ (0) THEN
      10020
```

```
10018  GOTO 10010
10020  VTAB (22)
10025  PRINT "TO CONTINUE PRINTIN
     G DESIGN INFORMATION"
10026  PRINT "PRESS <ANY KEY ."
10027  IF C$ =  > CHR$ (0) THEN
     10030
10028  GOTO 10010
10030  PRINT "T=";TK;" IN."; TAB(
     12);"P=";PYRAHEIT;" IN."; TAB(
     28);"B=";BASEHEIT;" IN."
10035  PRINT "TO CONTINUE PRINTIN-
     G DESIGN INFORMATION"
10036  PRINT "PRESS <ANY KEY>."
10037  GET C$
10038  IF C$ =  >  CHR$ (0) THEN
     10040
10039  GOTO 10010
10040  VTAB (22)
10050  PRINT "ANGLE THETA=";TETA;
     " DEG."; TAB( 22);"PLATEN WT
     .=";PLTWT;" LBS."
10060  VTAB (24)
10260  PRINT "WHEN FINISHED,PRESS
     <ANY KEY>."
10270  GET C$
10280  IF C$ =  >  CHR$ (0) THEN
     10300
10290  GOTO 10000
10300  TEXT
10310  RETURN
```

What is claimed is:

1. A resonant free platen system for vibration testing of test specimens, comprising: a cylindrical shaker head, an inverted truncated pyramid platen having an area for receiving specimens to be tested and coupled to said cylindrical shaker head, and means for vibrating said shaker head.

2. A resonant free platen system for vibration testing of test specimens as recited in claim 1, wherein said truncated pyramid platen has a form comprising a truncated square pyramid with its larger base joined to a truncated cube, all as one piece.

3. A system as in claim 1 wherein said truncated pyramid has respectively a top square cross-sectional area and a bottom square cross-sectional area of smaller side dimension, which said bottom and top area are plane parallel to one another.

4. A system as in claim 3 wherein test specimens are fastened at said top area, and the shaker head attached at said bottom area.

5. A system as in claim 4 wherein said platen is formed of aluminum.

6. A system as in claim 4 wherein said platen is formed of magnesium.

* * * * *